United States Patent Office 3,036,113
Patented May 22, 1962

3,036,113
PREPARATION OF ω-AMINOALKANE CARBONITRILES FROM LACTAMS
Johannes H. Ottenheym, Sittard, Netherlands, assignor to Stamicarbon N.V., Heerlen, Netherlands
No Drawing. Filed Sept. 10, 1959, Ser. No. 839,079
Claims priority, application Netherlands Sept. 17, 1958
4 Claims. (Cl. 260—465.2)

The present invention relates to the preparation of ω-aminoalkane carbonitriles from lactams.

It is well known (U.S. Patent No. 2,830,072) that this preparation can be carried out by passing a lactam in the vapor phase, mixed with excess of ammonia gas, over a dehydration catalyst, such as aluminum oxide, kaolin, or thorium oxide, at elevated temperature.

In this prior art process, the difficulty arises that the lifetime of the dehydration catalyst can widely vary. For example, in one case, it may be possible with a certain amount of catalyst to continue the process for two months, as a typical illustration, whereas in another case a catalyst of the same composition may lose so much of its activity after two weeks or even sooner, that it should not be used any further. In addition, the selectivity of the catalyst, i.e. the percentage of desired product formed with respect to the amount of converted starting material, falls. If this selectivity falls too strongly, the efficiency of the process will not only decrease accordingly, but difficulties will also arise in the further processing, e.g. in the dehydrogenation of the impure aminoalkane carbonitrile.

It is an object of the invention to provide a process in which the above-mentioned irregularities in the lifetime of the catalyst do not occur. A special object of the invention is the provision of a process which makes it possible to effect the conversion of lactams into ω-aminocarbonitriles with the catalyst having a high selectivity and a long lifetime. Further advantages of the process will be apparent hereinafter.

The process according to the invention for preparing ω-aminoalkane carbonitriles by passing a lactam in the vapor phase, mixed with excess of ammonia gas, over a dehydration catalyst at elevated temperature, is characterized by the fact that the vapor-gas mixture passed over the catalyst contains less than 1 p.p.m. by volume of oxygen. Preferably, the oxygen content is kept below 0.1 p.p.m. by volume.

The success of the invention is due to the discovery that very small amounts of oxygen over and above the limit indicated seriously impair the activity and selectivity of the catalyst. This discovery is surprising because in tests where the catalyst had only a very short lifetime, the oxygen content of the vapor-gas mixture passing over the catalyst was negative within the limit of accuracy of 0.1% by volume obtainable in normal gas analysis (absorption in a solution of CuCl in ammonium hydroxide). Under the circumstances, one would normally be inclined to assume that oxygen could not be responsible for the fall in selectivity of the catalyst for when an eightfold excess of ammonia is used, the presence of 0.1% by volume of oxygen, if reacting stoichiometrically with e.g. the starting material, would theoretically lower the selectivity by only 1%, whereas the actual fall in selectivity is appreciably greater and the said reaction with oxygen is negative.

In any event, it has been found that the above-noted difficulties are caused by the presence of minute amounts of oxygen. According to the invention, it has been discovered that the exclusion of these minute amounts of oxygen has the advantage that the lifetime of an amount of catalyst, which may be two months in one case and two weeks in another case, is not only made constant, but is moreover appreciably lengthened (up to three to four months). The lifetime of the catalyst can further be lengthened by also seeing to it that the temperature of the catalyst does not exceed 330° C. Typically, the temperature may be between 290 and 315° C. Lowering the catalyst temperature to below 330° C., without keeping the oxygen content of the vapor-gas mixture below 1 p.p.m. by volume, has little or no effect on the lifetime of the catalyst.

Penetration of oxygen into the vapor-gas mixture may take place in several ways, with the result that the mixture always contains some oxygen, e.g. 10–100 p.p.m. by volume. In the first place, lactam flakes always contain absorbed air. Therefore, it is advisable to melt the flakes under an oxygen-free gas, e.g. nitrogen, or in vacuo. The most important cause of oxygen penetration, however, lies in the ingress of air, which is also inevitable if the separation of the non-converted ammonia gas from the liquid reaction product is carried out, as is usual, under reduced pressure. Therefore, the process according to the invention is preferably so carried out that the non-converted ammonia gas, at least so far as it is recycled into the process, is separated from the liquid reaction product under a pressure higher than 1 atm., e.g. 1.05 to 1.5 atmospheres.

The oxygen content may e.g. be measured by extracting the gas to be tested together with some oxygen-free inert gas with sulfuric acid and applying the galvanic determination of oxygen according to U.S. Patent 2,805,191 to the gas that has thus been freed from ammonia.

The following example illustrates, but does not limit the present invention:

*Example*

Caprolactam flakes are melted under nitrogen and evaporated in a 20-fold excess of ammonia gas. The vaporization mixture is passed over activated aluminum oxide at a temperature of 310° C., with a contact period of 1.2 second. The reaction product is condensed under a pressure of 1.3 atm. abs. and at a temperature of 15° C., in which operation the gaseous components are separated from the liquid ones. The gaseous components are recycled into the process.

In the liquid reaction product, the percentages of non-converted caprolactam and 5-amino-pentane carbonitrile formed are determined. If the whole apparatus has previously been purged for a long time with nitrogen that has been completely freed of oxygen by passing it over copper at about 300° C., these percentages are 60.0 and 39.2 mol percent at the end of the first day. The activity (i.e. the amount of starting material converted per unit time) decreases by 0.1% on an average per 24 hours. Consequently, if the catalyst is to be used until the fall in activity amounts to 20%, the lifetime of the catalyst is two hundred days.

If so much air is allowed to leak in that the vapor-gas mixture which is passed over the catalyst contains 1 p.p.m. by volume of oxygen, the fall in activity per 24 hours averages 1%, which reduces the lifetime of the catalyst to twenty days.

It will be appreciated that the invention is by no means restricted to the preparation of 5-amino-pentane-carbonitrile. The process according to the invention may also be applied to the conversion of other lactams, e.g. caprylolactam and the like, into the corresponding amino-alkane-carbonitriles. Use may also be made of other catalysts which react neutrally or almost neutrally in water, such as kaolin or thorium oxide. It is also possible to place the oxygen-absorbing substance before the catalyst in the process, which ensures that the catalyst does not come into contact with oxygen. Conditions utilized herein for preparing the ω-amino-alkane-carbonitrile, e.g. temperatures, proportions, etc., may conform with those outlined in U.S. Patent No. 2,830,072.

Having described the invention herein, what is claimed as new is:

I claim:

1. In a process for preparing an ω-amino-alkane-carbonitrile by dehydrating the corresponding lactam in the vapor phase and in the presence of ammonia gas using a dehydration catalyst, and then recovering the resulting ω-amino-alkane-carbonitrile, the improvement of maintaining in the dehydration zone a free oxygen content, by volume, of less than 1 part per million parts of ammonia gas and lactam vapor in said zone.

2. The improved process of claim 1 wherein the free oxygen content is less than 0.1 p.p.m.

3. The improved process of claim 1 including the further step of separating non-converted ammonia gas from the resulting ω-amino-alkane-carbonitrile by condensing the latter at a pressure greater than 1 atmosphere and up to about 1.5 atmospheres.

4. The process of claim 3 wherein said lactam is ε-caprolactam, said ω-amino-alkane-carbonitrile is ω-aminohexanenitrile and said separation is effected at a pressure between 1.05 and 1.5 atmospheres.

References Cited in the file of this patent
UNITED STATES PATENTS 2,830,072   Garritsen et al. _____ Apr. 8, 1958